(12) United States Patent
Vanstone et al.

(10) Patent No.: US 6,337,909 B1
(45) Date of Patent: *Jan. 8, 2002

(54) GENERATION OF SESSION KEYS FOR EL GAMAL-LIKE PROTOCOLS FROM LOW HAMMING WEIGHT INTEGERS

(75) Inventors: Scott A. Vanstone, Waterloo (CA); Donald B. Johnson, Manassas, VA (US); Robert J. Lambert, Cambridge; Ronald C. Mullin, Waterloo, both of (CA)

(73) Assignee: Certicom Corp., Mississauga (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,796

(22) Filed: Oct. 10, 1997

Related U.S. Application Data

(63) Continuation-in-part of application No. 08/728,260, filed on Oct. 10, 1996, now abandoned.

(51) Int. Cl.[7] ................................................. H04L 9/28
(52) U.S. Cl. ......................................................... 380/28
(58) Field of Search .............................. 380/30, 44, 28, 380/48

(56) References Cited

U.S. PATENT DOCUMENTS 5,299,262 A * 3/1994 Brickell et al. ................ 380/28
5,627,893 A * 5/1997 Demytko ....................... 380/30
5,850,450 A * 12/1998 Schwelzer et al. ............ 380/30

FOREIGN PATENT DOCUMENTS

| FR | 2734679 A | 11/1996 | ............ H04L/9/30 |
| FR | WO 9747110 | * 12/1997 | ............ H04L/9/30 |
| GB | 0792043 | * 7/1998 | ............ H04L/9/30 |
| GB | 0854603 A | * 7/1998 | ............ H04L/9/30 |

OTHER PUBLICATIONS

Bruce Schneier, Applied Cryptography 2e, John Wiley, 1995.*

Wayne Patterson, Mathematical Cryptology for Computer Scientists and Mathematician, Rowman & Littlefield, 1987.*

(List continued on next page.)

*Primary Examiner*—Gail Hayes
*Assistant Examiner*—James Seal
(74) *Attorney, Agent, or Firm*—The Maxham Firm

(57) ABSTRACT

The public key, either short term "session" key or long term key, is generated by combining a pair of components. A first component is obtained by utilizing an integer with a relatively low Hamming weight as an exponent to facilitate exponentiation. The second component is a precomputed secret value that is of the form resulting from the exponentiation of the generator of the group element by an integer that has the requisite Hamming weight. The two components are combined to provide the public key and the two exponents combined to provide the corresponding private key.

13 Claims, 4 Drawing Sheets

OTHER PUBLICATIONS

Neal Koblitz, A Course in Number Theory and Cryptography, Springer–Verlag, 1987.*

A. Menezes, Elliptic Curve Public Key Cryptosystems, Kluwer Academic Publishers, 1993.*

Schneier, Applied Cryptography, John Wiley and Sons, p. 478, Oct. 1995.*

Menezes, et al., Handbook of Applied Cryptography, CRC Press, p. 105, 1996.*

Rosati, A High Speed Data Encryption Processor for Public Key Cryptography, IEEE, 1989.*

Dimitrov, Two Algorithm for Modular Exponentiation Using Nonstandard Arithmetics, IEEE, Jan. 1995.*

Rosati T: "A High Speed Data Encrytion Processor for Public Key Crytography" Proceedings of the Custom Integrated Circuits Conference, US, New York, IEEE, vol. Conf. 11, 1989, pp. 1231–1235 XP0000757631 *PG 1231, Right Column *PG 1233 Right Column *PG 1234 Left Column.

Heiman R: "A Note on Discrete Logariths with Special Structure" Lecture Notes Incomputer Science, US, Springer Verlag, New York, NY, vol. 658, Jan. 1, 1993, pp. 454–457, XP000562427 ISSN: 0302–9743 * Entire Document.

Menezes A J Et Al.: "Eiliptic Curve Cryptosystems and Their Implementation" Journal of Cryptology, US, New York, NY, vol. 6, No. 4. Jan. 1, 1992, pp. 209–224, XP002069135 *PG 218–PG 219 * PG 222–PG 223*.

* cited by examiner

US 6,337,909 B1

GENERATION OF SESSION KEYS FOR EL GAMAL-LIKE PROTOCOLS FROM LOW HAMMING WEIGHT INTEGERS

CROSS REFERENCE TO RELATED APPLICATIONS

This application is a Continuation-in-Part of U.S. application Ser. No. 08/728,260, filed Oct. 10, 1996, now abandoned.

BACKGROUND OF THE INVENTION

The present invention relates to public key encryption systems and more particularly to the generation of session parameters for use with public key protocols.

Public key data encryption systems are well-known and the more robust are based upon the intractability of the discrete log problem in a finite group. Such public key encryption systems utilize a group element and a generator of the group. The generator is an element from which each other group element can be obtained by repeated application of the underlying group operation, ie. repeated composition of the generator. Conventionally, this is considered to be an exponentiation of the generator to an integral power and may be manifested as a k fold multiplication of the generator or a k fold addition of the generator depending upon the underlying group operation. In such a public key encryption system, an integer k is used as a private key and is maintained secret. A corresponding public key is obtained by exponentiating the generator a with the integer k to provide a public key in the form $\alpha^k$. The value of the integer k cannot be derived even though the value $\alpha^k$ is known.

The public and private keys may be utilized in a message exchange where one of the correspondents may encrypt the data with the recipient's public key $\alpha^k$. The recipient receives the encrypted message and utilizes his private key k to decrypt the message and retrieve the contents. Interception of the message will not yield the contents as the integer k cannot be derived.

A similar technique may be utilized to verify the authenticity of a message by utilizing a digital signature. In this technique, the transmitter of the message signs the message with a private key k and a recipient can verify that the message originated from the transmitter by decrypting the message with the transmitter's public key $\alpha^k$. A comparison between a function of the plain text message and of the recovered message confirms the authenticity of the message.

In both techniques, it is necessary to perform the exponentiation of the group element $\alpha$. To be secure, k must be a relatively large number and the exponentiation can therefore be relatively long. Where the exponent is used as a long-term public key, the time of computation is not of undue concern. However, in digital signature schemes, a short term session key is utilized together with the long-term public key. Each message is signed with a different private key k and the corresponding public session key $\alpha^k$ has to be computed and transmitted with the message. There is therefore the need for some efficiency in the exponentiation.

The computing time for the exponentiation can be reduced by utilizing an integer exponent k having a relatively low Hamming weight—that is, the number of 1's in the binary representation of the integer is kept low or analogously in another radix, the exponent has few non-zero coefficients. However, integers having low Hamming weights are considered vulnerable to various attacks, including a square root attack, and so their use in encryption protocols is not encouraged.

SUMMARY OF THE INVENTION

It is therefore an object of the present invention to provide a method of computing the session parameters for public key exchange protocols that obviates or mitigates the above disadvantages.

In general terms, the present invention provides a method of computing an exponent for use in a public key exchange protocol in which an integer k' is selected, having a Hamming weight less than a predetermined value. An exponentiation with the generator $\alpha$ is performed and the resultant intermediate session parameter $\alpha^{k'}$ is mathematically combined with a secret value $\gamma$. $\gamma$ is derived from a random integer i which has a Hamming weight greater than the predetermined value. The mathematical combination of $\gamma$ with the intermediate session parameter produces a session parameter whose exponent has a Hamming weight greater than the predetermined value and as such is considered computationally secure.

Conveniently, the secret value $\gamma$ can be precomputed so that the real time exponentiation is confined to the generation of the exponent that utilizes the integer k'.

The method may be used with the multiplicative group $Z^*_p$ or may be utilized with other groups such as elliptic curves over a finite field.

BRIEF DESCRIPTION OF THE DRAWING

Embodiments of the invention will now be described by way of example only with reference to the accompanying drawings, in which.

DETAILED DESCRIPTION OF THE PREFERRED EMBODIMENTS

Figure 1:
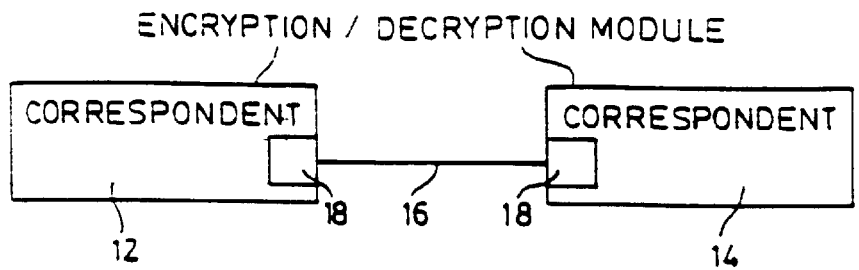
FIG. 1 is a schematic representation of a data communication system.

Referring therefore to FIG. 1, a data communication system 10 includes a pair of correspondents 12,14 respectively. Each of the correspondents 12,14 can generate a message M and forward it through a communication link 16 to the other correspondent and each have an encryption/decryption module 18 to process the message M prior to transmission and upon receipt.

In order to permit the correspondent 14 to verify that a message has been generated by the correspondent 12, various protocols have been derived that permit signature of the message M and subsequent verification upon receipt of the transmitter of the message. For the purposes of illustration, a simple El Gamal-type protocol for signing the message M will be utilized although it will be understood that other more sophisticated protocols may be utilized and similar advantages obtained. Likewise, the generation of session parameters may be used for Diffie Hellman encryption schemes other than digital signatures.

Figure 2:
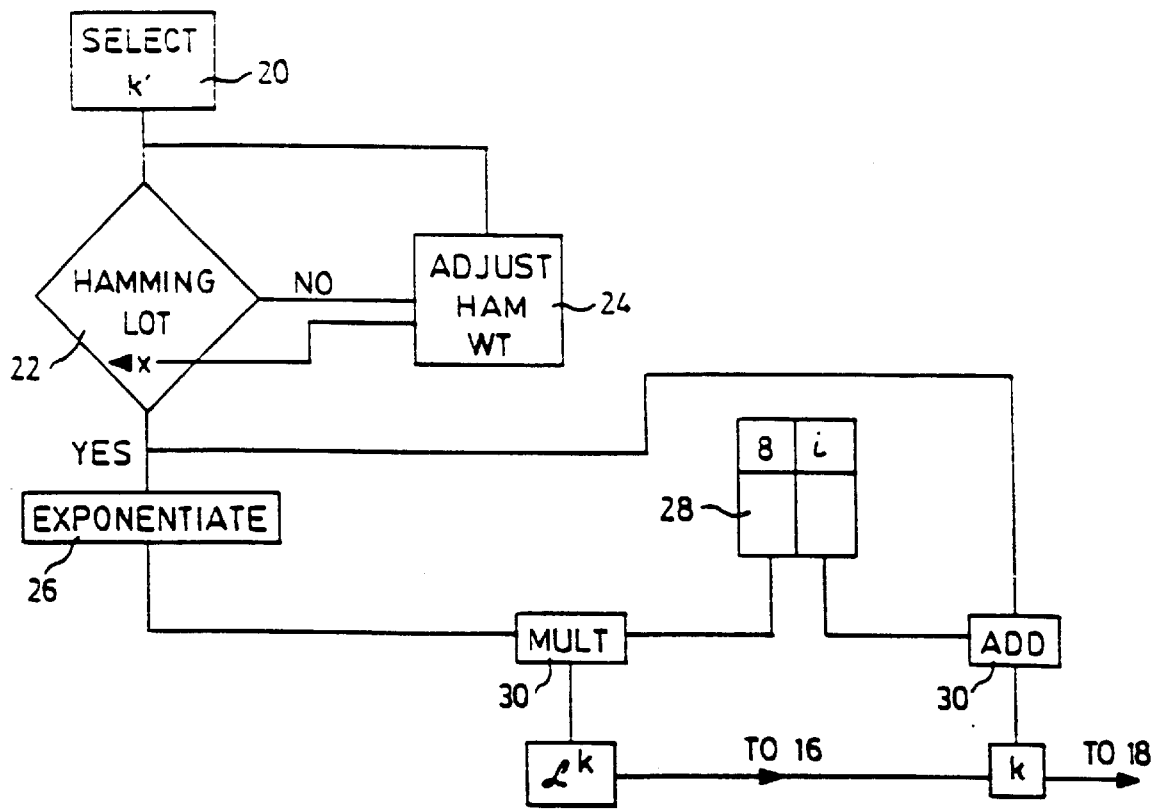
FIG. 2 is a flow chart showing the generation of the session parameters in the multiplicative group $Z^*_p$.

As illustrated schematically in FIG. 2, in order to sign the message M, the correspondent 12 selects an integer k' from an integer generator 20 and checks it at comparator 22 to ensure it has a Hamming weight of less than a predetermined level that would normally be considered computationally insecure. For example, with a field of 155, an integer k' having a Hamming weight of less than 15 could be used. If necessary, a random number can be generated and the Hamming weight can be adjusted at a comb 24 to ensure that it is below the predetermined value that facilitates the computation.

A k' fold composition of the generator $\alpha$ is then performed. For a public key system using a multiplicative group of the integers mod p, where p is a prime, ie. $Z_p$, the intermediate session key $\alpha^{k'}$ is then computed in exponentiator 26 utilizing a known exponentiation algorithm such as the "square and add" algorithm. Because the majority of the binary digits are zero, the exponentiation is relatively quick and the intermediate session parameter is obtained.

The correspondent 12 then retrieves from a table 28 a precomputed value of an element $\gamma$ which is of the form $\alpha^i$. The integer i is a random integer and as such the Hamming weight can be assumed to be in the order of 50%. The table 28 containing the value of i and the corresponding value of $\gamma$ are maintained securely.

The secret value of $\gamma$ and the intermediate session parameter $\alpha^{k'}$ at are multiplied in arithmetic processor 30 to provide a session parameter $\alpha^{k'+i}=\alpha^k$. The multiplication of two components may be performed relatively quickly and therefore the session parameter $\alpha^k$ may be computed in real time.

At the same time, the value k which is equal to i+k' is computed in the arithmetic processor 30 and used to encrypt or sign the message M in the encryption module 18. The message M and the signature are transmitted to the recipient 14 over the communication channel 16 together with the session parameter $\alpha^k$. The recipient 14 then decrypts the signed message using the session parameter $\alpha^k$ and compares the content of the decrypted message with the transmitted message to ensure that they are the same.

The utilization of the relatively low Hamming weight for the integer k' does not render the session parameter $\alpha^k$ vulnerable, as the secret value $\gamma$ will have an adequate Hamming weight. Accordingly, the Hamming weight of the integer k will also be adequate for security purposes.

Figure 3:
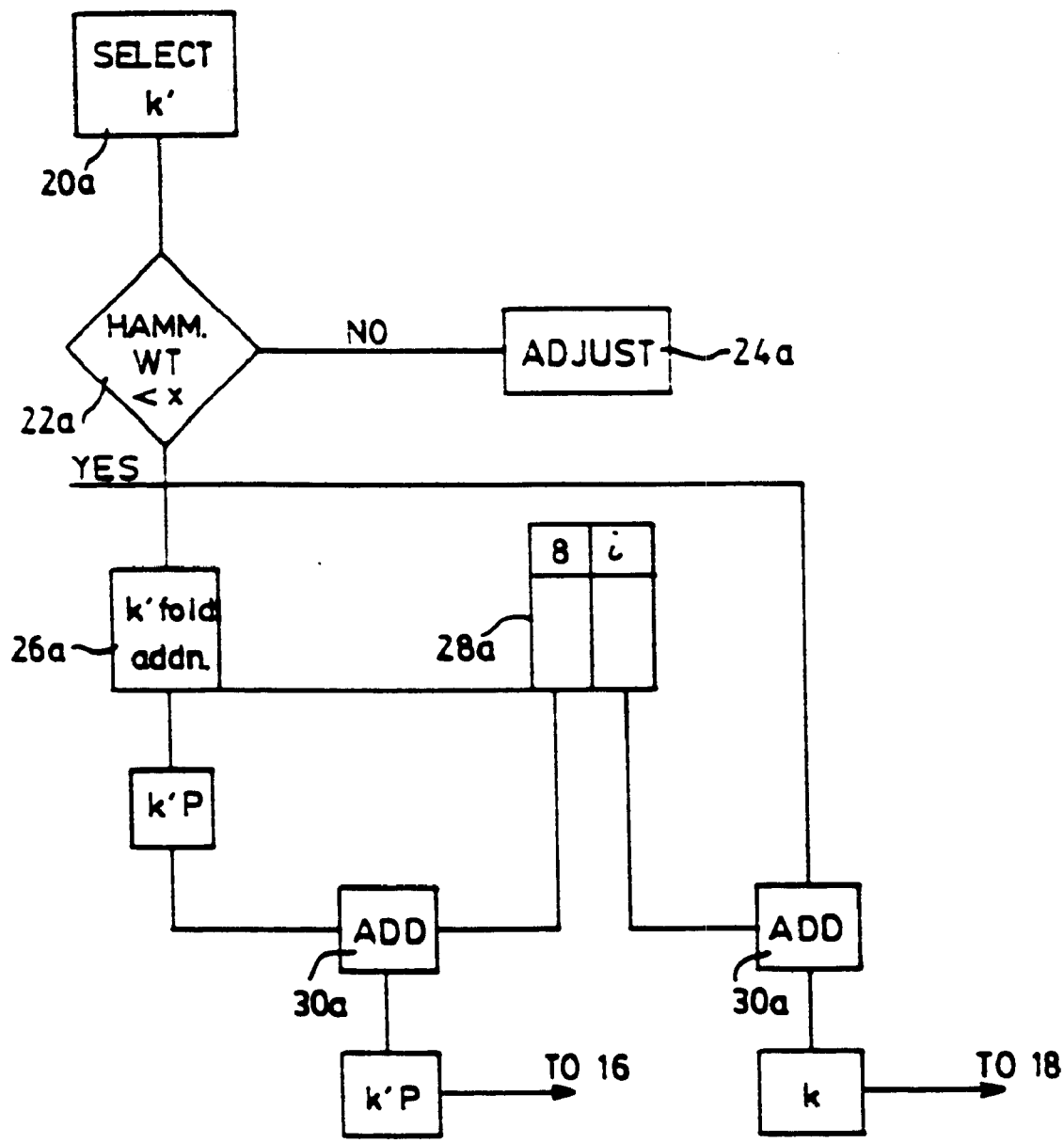
FIG. 3 is a flow chart showing the generation of the session parameters in the elliptic curve.

The technique may also be used in elliptic curve encryption systems as illustrated in FIG. 3 where like components are identified with like reference numerals with a suffix 'a' added for clarity. With an elliptic curve encryption system, the group element used as a public key corresponds to a point kP which is obtained from the k-fold addition of a generator P. The underlying field operation is addition and therefore the group element kP is representative of exponentiation of the generator P to the power k. The security of the public key kP results from the addition of points on the curve or by the multiplication of a point by an integer which is equivalent to multiple additions.

The addition of a pair of points on the curve is relatively complex and the requirement for multiple additions offsets some of the advantages from the inherently greater strengths of the elliptic curve encryption systems.

To facilitate the use of such encryption systems, an integer k' is selected by generator 20a having a Hamming weight less than a predetermined value, which would normally be considered insecure. The intermediate session parameter k'P is computed by a k' fold composition of the point P, ie. by k' additions of an initial point P in the elliptic point accumulator 26a. The relatively low Hamming weight reduces the point additions necessary to facilitate computation of the value k'P.

A secret value $\gamma$ is precomputed from an integer i which is randomly generated and has a Hamming weight of greater than the predetermined value. The value of $\gamma$ is obtained from the i fold addition of the point P, ie. $\alpha$=iP, and $\alpha$ and I are stored in table 28a.

The intermediate session parameter k'P and the secret value iP are then added to arithmetic processor 30a to obtain the new point kP. The integer k may be computed in the processor 30a by the transmitter 12 from the addition of k' and i and the resultant signature prepared in the encryption module.

Again, however, the selection of the initial integer k' with a relatively low Hamming weight reduces the computational time to obtain the intermediate session parameter and subsequent mathematical combination with the secret value yields a session parameter whose multiplying value k has the requisite Hamming weight.

In each case, the use of a relatively low Hamming weight used for the integer k' is masked by the combination with a random integer having a Hamming weight greater than the predetermined value.

In the situation where the elliptic curve cryptosystem uses an anomalous curve, then exponentiation may be obtained by a square and add algorithm.

Figure 4:
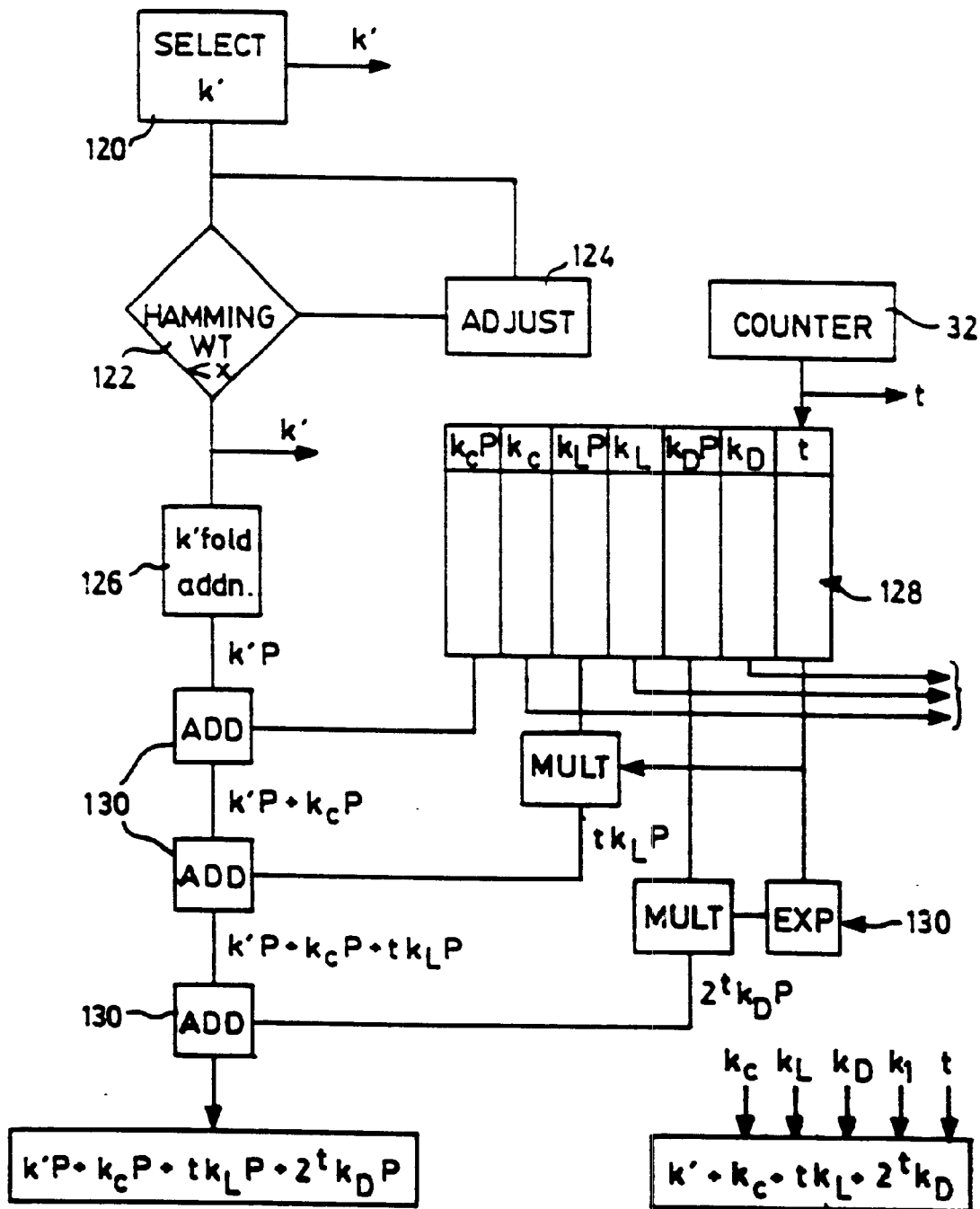
FIG. 4 is a flow chart similar to FIG. 3 of an alternative embodiment of the generation of session parameters.

A further embodiment is shown in FIG. 4 in which like reference numerals will be used to denote like components with a prefix 1 added for clarity. In the embodiment of FIG. 4, additional terms are introduced in to the computation of the integer k to provide enhanced security. The integer k is formed from the combination of a low Hamming weight term k' generated by integer generator 120 with the varying terms derived from additional integers $k_C$, $k_L$, $k_D$ to have the form $$k=k'+k^*_C+k^*_L+k^*_D.$$

Similarly, $$kP=k'P+k^*_CP+k^*_LP+k^*_DP.$$

The integers $k_C$, $k_L$, and $k_D$ are stored in a lookup table 128 with precomputed corresponding values of $k_CP$, $k_LP$ and $k_DP$. In the example of FIG. 4, the integers $k_C$, $k_L$, $k_D$ are retained as separate sets of values although as will be explained below a single set of integers may be used. The values of the integers in table 128 are indexed against a reference term t, typically the output of an incrementing counter 32 that increases at each generation of the session key k.

In the preferred embodiment, the term $k^*_C$ is a constant term corresponding to the integer retrieved from lookup table 128 for the given value of t. The terms $k^*_L$, $k^*_D$ are provided by integers $k_L$ and $k_D$ respectively that are modified by the reference term t so as to vary for each generation of the session key k.

The term $k^*_L$ is a linear term of the form $t.k_l$ and the term $k^*_D$ is of the form $2^t.k_D$. As t varies, the values of $k_C$, $k_L$ and $k_D$ will vary from the lookup table and the corresponding value of $k^*_L$ and $k^*_D$ will vary with the value of the reference term t.

In this embodiment, the value k therefore has the form $k=k'+k_{C_t}+tk_{L_t}+2^tk_{D_t}$ where $k_{C_t}$, $k_{L_t}$ and $k_{D_t}$ are the values of $k_C$, $k_L$ and $k_D$ at time t.

In operation therefore, as shown schematically in FIG. 4, upon initiation of the generation of the session key k, a value of k' is selected from generator 128 with a low Hamming weight and the corresponding value of k'P is computed by exponentiator 126. The output t of counter 32 is used as the reference term for the lookup table 128 to retrieve corresponding values of $k_C$, $k_L$, $k_D$ and the related points $k_C P$, $k_L P$, and $k_D P$.

The term $k_C P$ corresponds to the term $k^*_C P$ and therefore may be added to k'P in arithmetic processor 130. The term $k^*_L$ is obtained from a t fold addition of the point $k_L P$ retrieved from table 128 and added in processor 130 to the value of $k'P + k_C P$.

Similarly, the term $k^*_D P$ is obtained from a $2^t$ fold addition of $k_D P$ retrieved from the table 128 and added to the previous value to provide the session key kP. Likewise the value of k can be obtained from addition of k', $k_C$, $k^*_L$ and $k^*_D$.

It will be appreciated that each of the additions involves the addition of a pair of points on an elliptic curve. The computation of $k^*_L P$ and $k^*_D P$ may be obtained relatively easily using successive doubling of the point or substitution in the binary representation of the value of t.

In addition, the use of $k^*_C$, $k^*_L$ and $k^*_D$ may be permuted as successive signatures are computed so as to introduce additional complexity.

The value can be chosen with a suitably low Hamming weight. Similarly, values of $k_L$ or $k_D$ may be chosen to have a relatively low Hamming weight if preferred for ease of computation but it is preferred that $k_C$ has a satisfactory Hamming weight to provide adequate security at t=o. In general, however, it is preferred that each value of $k_C$, $k_L$ and $k_D$ has an adequate Hamming weight for computational security. As described below, the computation required from signature to signature may be reduced so that it is preferred to maintain the value of $k_L$ and $k_D$ above a predetermined level. In the above example, it has been assumed that the values of $k_C$, $k_L$, and $k_D$ have been selected from different sets of values. However, the values could be selected from the same table using a predetermined permutation of values or could be the same integer used in each term to simplify computation.

Similarly, the form of k could include additional and/or different terms to introduce non-linearity in addition to the constant, linear and doubling terms described and complexity and could in fact include additional functions such as the Frobenius operator in the computation of k when appropriate. The additional terms are chosen to provide ease of computation and a final Hamming weight above a predetermined value that is considered computationally secure.

Figure 5:
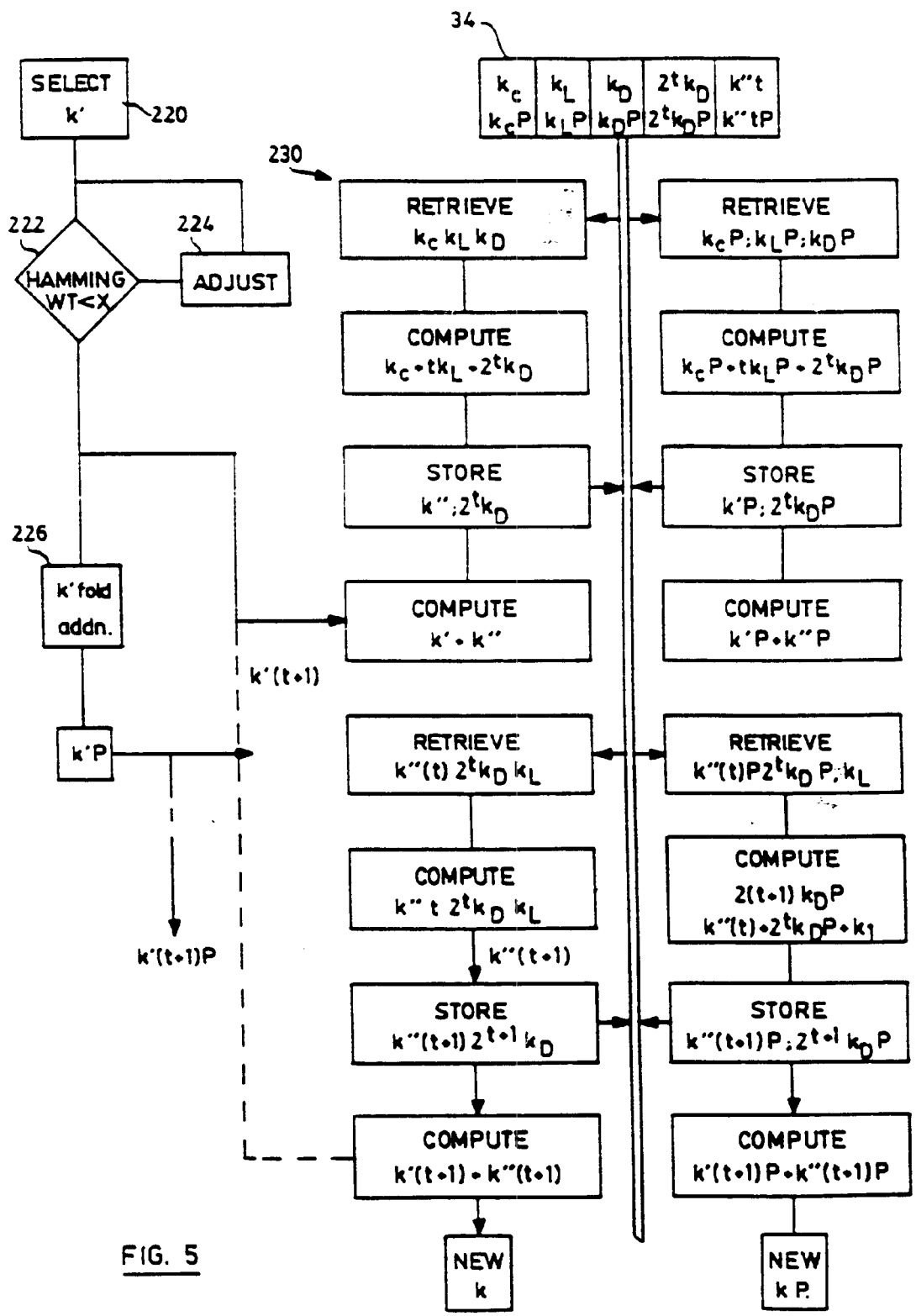
FIG. 5 is a flow chart showing a further embodiment of generation of session parameters.

A further algorithm for determining successive values of k and kP is shown in FIG. 5.

Assume a form of k as described above, such that $$k = k' = k_C + t k_L + 2^t k_D$$

and $$kP = k'P + k_C P + t k_L P + 2^t k_D P.$$

Initially, the values of $k_C$, $k_L$ and $k_D$ and corresponding values $k_C P$, $k_L P$ and $k_D P$ are stored in registers 34.

The new value of k at time t is k'(t)+k"(t)

where $$k''(t) = k_C + t k_L + 2^t k_D.$$

k'(t) is the new integer with a low Hamming weight generated by generator 220.

To compute a new value of k, the value of k"(t) is computed in arithmetic processor 230 using the values stored in the registers 34. The resultant value of k"(t) is added to k'(t) to obtain the new value of k.

To facilitate computation of the next value of k, ie. k(t+1), the computed values of k"(t); $2^t k_D$ together with $k_C$ and $k_L$ are stored.

To obtain k(t+1), it is necessary to obtain k'(t+1) and generate k"(t+1). This can be readily achieved using the stored values.

$$k''(t+1) = k_C + (t+1)k_L + 2^{(t+1)}k_D$$
$$= (k_C + t k_L + 2^t k_D) + 2^t k_D + k_L$$
$$= k''(t) + 2^t k_D + k_L.$$

Each of these terms is stored in registers 34 and can readily be retrieved to provide the value of k"(t+1) which is then combined with k'(t+1) to provide the new k at time (t+1).

The registers 34 are updated so that the value of k"(t) is replaced with k"(t+1), the value of $k_L$ retained and the value of $2^t k_D$ replaced with $2^{(t+1)} k_D$.

The next value of k at time (t+2) can then be obtained in a similar manner.

A similar procedure is available for computing the value of k(t+1)+P.

The values of k"(t)P, $k_L P$ and $2^t k_D P$ are stored in registers 34.

k'(t+1)P is obtained by multiple point additions in the elliptic point accumulator 226 as before.

The value of k"(t+1)P is obtained by computing $$k''(t)^P + t k_L P + 2^t k_D P.$$

Each of these terms is stored in the registers 34 and readily retrieved.

These terms are updated by corresponding terms for time (t+1) and to facilitate this, the point $2^t k_D P$ is first doubled to provide $2^{(t+1)} k_D P$. This is then stored and also added to $k_L P$ and k"(t) to obtain k"(t+1)P. Again this is stored and also added to k'(t+1)P to give the new value of k(t+1)P.

The computation k"(t+1)P is therefore achieved with 1 point doubling and 3 point additions which in combination with the low Hamming weight of k' leads to a very efficient generation of the system parameters.

As noted above, additional complexity may be introduced by permuting the registers containing the related pairs of stored value for successive generation of the session parameters k and $\alpha^k$.

In summary, the generation of a session parameter is facilitated by utilizing a low Hamming weight integer for ease of computation and combining it with a precomputed value or set of values to mask the low Hamming weight. Additional complexity may be introduced by providing non-linear terms in the set of values and/or by permuting the set of values from signature to signature. In this way, the successive session values are resistant to attacks but the computations may be performed efficiently.

It will be appreciated that the above computations may be performed on an integrated circuit or executed in software on a general purpose computer depending upon the particular application.

The embodiments of the invention in which an exclusive property or privilege is claimed are defined as follows:

1. A method of obtaining a group element for use as a public component of a public key encryption scheme and a corresponding private key k, said public component corresponding to a k-fold composition of a generator of that group, where k is an integral value having a Hamming weight greater than a predetermined value, to provide a requisite level of security, said method comprising the steps of:

i) selecting an integer k' which has a Hamming weight less than said predetermined value;

ii) performing a k' fold composition of the generator to provide an intermediate session parameter;

iii) combining said intermediate session parameter with a secure value γ derived from an i fold composition of the generator where i is an integer having a Hamming weight greater than said predetermined value to obtain said group element; and iv) combining said integers k' and i to provide a corresponding private key component k.

2. The method according to claim 1 wherein said secure value is precomputed and maintained secret.

3. A method according to claim 1 in which said group is a multiplicative group of integers mod p.

4. A method according to claim 3 wherein said intermediate session value and secure value are combined by multiplication.

5. A method according to claim 1 wherein said group is an elliptic curve over a finite field.

6. A method according to claim 5 wherein said secure value and said intermediate session value are combined by performing an addition on an elliptic curve over a finite field.

7. A method according to claim 1 wherein said secure value is obtained by generation of a random number as an exponent.

8. A method according to claim 7 wherein said random number and resultant secure value are stored and extracted for combining with said intermediate session value.

9. A method according to claim 1 wherein said secure value is derived from a combination of terms, each of which has a value derived from an integral number of compositions of said group element.

10. A method according to claim 9 wherein at least one of said terms introduces a non linearity to successive secret values.

11. A method according to claim 10 wherein said one of said terms includes a time varying integer in said composition.

12. A method according to claim 9 wherein said terms are permuted amongst themselves after each successive signature.

13. A method according to claim 12 wherein at least one of said terms introduces a non-linearity to successive secret values.

\* \* \* \* \*